Jan. 5, 1960   L. SCHEICHL   2,920,128
METHOD FOR THE MANUFACTURE OF BATTERY ELECTRODES
Filed March 29, 1956
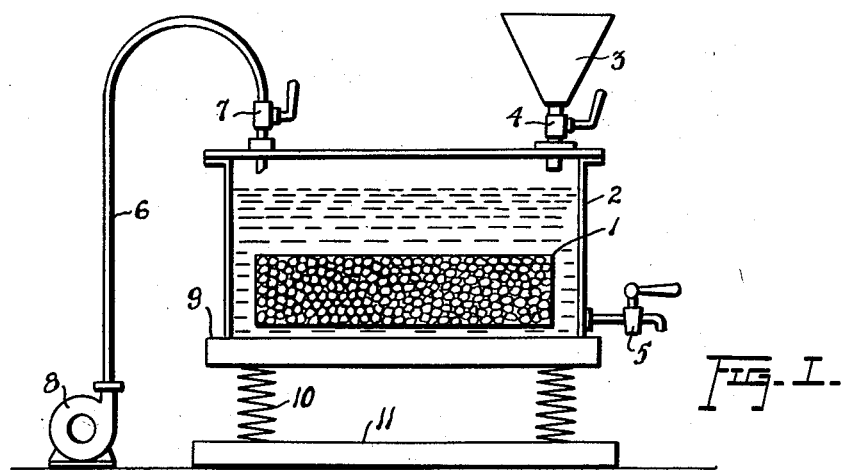
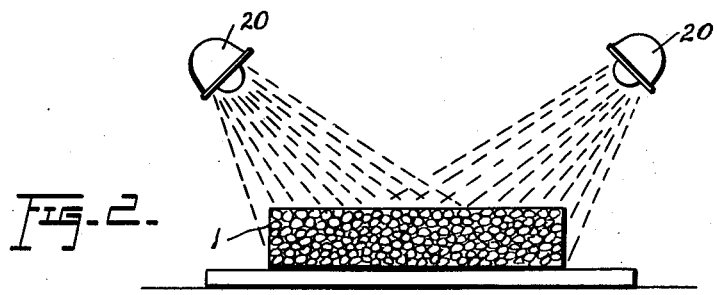
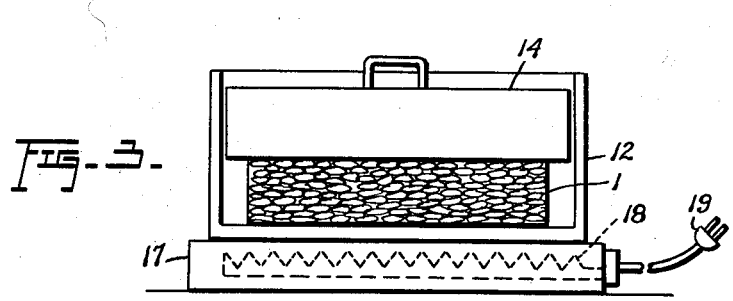
Inventor:
Ludwig Scheichl
By Kurt Kelman
Agent

2,920,128
METHOD FOR THE MANUFACTURE OF BATTERY ELECTRODES

Ludwig Scheichl, Koblenz, Germany, assignor to Friedrich Hermann, Dortmund, Germany Application March 29, 1956, Serial No. 574,641

7 Claims. (Cl. 136—27)

The present invention relates to methods of producing electrodes for primary and secondary batteries.

It is a more particular object of the present invention to provide electrodes which combine a low weight with an increased electrical capacity and a longer life.

It is a further object of the present invention to incorporate the electro-chemically active material, such as lead or lead dioxide, in a carrier which can be readily produced and processed and which will protect the active material from being washed out when the electrode is in use.

It is already known that it is possible to reduce the weight of the electrode by increasing the effective surface of the electro-chemically active mass of the electrode. To this end, various proposals have been made to render the electrode porous, and proposals have likewise been made to improve the cohesion of the particles of a porous mass. For the purpose of producing porous electrodes it is known that additions of substances such as wood meal, may be made which can be subsequently removed by combustion and which then leave cavities, or of substances such as salts which can be subsequently removed by dissolving them out. Other proposals relate to the use of mixtures of active materials and binding agents which by the addition of substances evolving a gas and their treatment to release the gas, such as carbon dioxide, produce a porous structure.

However, all these methods merely succeed in producing indeterminate structures incorporating a more or less interconnected framework of carrier materials in which the active mass is irregularly dispersed. In many instances large portions of the total mass of active material are totally occluded and thus prevented from making contact with the electrolyte. In other cases the formation of wide passages which communicate with the exterior permits the embedded active mass to escape and to be washed away.

Even the proposal to convert a mixture of active material and foamable synthetic plastic substances by means of a foaming agent into a solid foam in which the bubble walls are formed by the mixture of binding agent and active material, is incapable of satisfying every requirement. Nevertheless, this latter procedure does increase the surface and provides a foam structure that serves as a carrier for the active material besides affording the advantage of representing a well-defined system of high static strength. When using suitable synthetic plastic substances the bubble walls satisfactorily withstand the mechanical stresses imposed upon their structure during the charging and discharging operations. However, a very substantial proportion of the particles of active material remains occluded in the interior of the carrier and thereby remains out of reach of the electrolyte.

As a matter of fact, it is impossible arbitrarily to reduce the wall thickness of the bubbles because apart from the mechanical strength of the foam which acts as the binding agent or carrier, consideration must also be given to the need of maintaining the required plasticity and foam forming ability of the carrier when mixed with the non-binding active material. The required quantity of synthetic substance and the necessary content of active material, such as lead powder, to produce an adequate capacity does not therefore exclude the possibility of particles of active material being isolated and locked up in the interior of the bubbles. Moreover if adhesion to the bubble walls is not sufficiently strong, active particles lodged on the bubble surface may be easily detached and washed away.

The electrode according to the present invention likewise embodies a foam structure which consists of materials highly resistant to the electrolyte. The substances are selected from among those that will retain their resistance even when the current generates considerable heat. However, there is a fundamental difference that distinguishes the novel electrode from known types of foamed electrodes and this consists in that the foam structure framework incorporates no active material in the form of a constituent of the mixture from which the foam is produced. In contradistinction to prior proposals, the active material is trapped and held in the bubbles of the foamed material, the foam itself being an open structure with the bubbles connected by pores that are preponderantly of smaller diameter than the particles of active material.

The accompanying drawing schematically illustrates one embodiment of the method of the invention, wherein Fig. 1 shows the step of filling the porous carrier with active material;

Fig. 2 shows the step of partially drying the porous carrier after it has been filled with active material; and Fig. 3 shows the compression step.

The schematically illustrated apparatus for carrying out the steps of the present invention forms no part of the present invention and any suitable apparatus may be used for this purpose.

Referring now to Fig. 1, there is shown a commercially available polyethylene foam plate or sheet 1 of several centimeters thickness and an average bubble diameter of about 0.5 mm. For purposes of illustration, the size of the bubbles is exaggerated in the drawing. The synthetic resin foam blank 1 is placed in an airtight container 2 which has an inlet hopper 3 controlled by valve 4 and an outlet valve 5. The interior of the container may be evacuated through line 6 leading to vacuum pump 8, control valve 7 being provided in line 6. The container is mounted on fixed base 11 by means of springs 10 to make vibration of the container possible.

After the synthetic resin foam blank has been placed into container 1 and the container has been closed, valve 7 is opened to evacuate the container and simultaneously to remove air from the bubbles of the foam. After evacuation, valve 7 is closed and a colloidal dispersion of lead dioxide in water, with an addition of a wetting agent, is introduced into the container through hopper 3 while valve 4 is open. After the container is filled with the dispersion, valve 4 is closed and the container is forcefully vibrated. The vibration causes the lead dioxide dispersion to enter into the foam bubbles and is then discontinued, whereupon excess dispersion is removed from the container by opening valve 5. The container may thereupon be evacuated again, another charge of lead dioxide dispersion may be shaken into the foam and this procedure may be repeated several times until the bubbles are well filled with the active material dispersion.

The thoroughly impregnated synthetic resin foam plate is then removed from the container and subjected to infrared radiation under lamps 20 (see Fig. 2) to dry the plate. After drying, the plate is placed into a container 12. The heavy press 14 slidably fits within the container and rests on the plate. The container is mounted on a heater 17 provided with a resistance coil 18 connected to an electric current source by a plug 19. The impregnated synthetic resin foam plate is then heated to a few degrees below the softening point of the synthetic resin and pressure of press 14 is maintained until compression resistance increases abruptly. Then the press is removed.

The types of material suitable to serve as carrier substances are synthetic plastic materials which form open foams and are already known for purposes of insulation. For instance, the carrier substances may be "Moltopren," a trade name for a known, foam-like, solid synthetic plastic material produced by the combination of a polyester of a di-carboxylic acid and a trivalent alcohol with a di-isocyanate. This solid foam plastic material exhibits a high compressional strength when solid and is of very low weight. Other commercially available foamed synthetic plastics of more or less flexibility can be likewise employed, such as for instance foamed polystyrenes or polyethylene. Preferably, the diameter of the bubbles in these foamed synthetic plastics should not be less than 0.1 mm. and not more than 0.5 mm. Alternatively, the production of electrodes according to the invention may also be based on the use of other foamable plastics which exhibit the above-mentioned properties for the purpose in question, for instance a polyethylene with the addition thereto of a foaming agent, such as azoisobutyronitrile, which after liquefaction in a mould is transformed into a foam-like body. If in course of the foaming procedure the pressure is abruptly reduced at the moment of maximum gas evolution, a moment which can be easily determined beforehand by test, a foam consisting of very fine lamellae will ensue, and consist of bubbles of approximately uniform size interconnected by pores.

As illustrated, the sheets or strips of solidified foam or corresponding shapes of commercially available synthetic foams of the kind hereinabove specified are filled with the electro-chemically active material or they are filled with a substance such as a suspension of lead dioxide in water, and the pores which permit the active material to penetrate into the bubbles are constricted by a subsequent treatment of the porous carrier material to stop the particles from re-emerging from the bubble interior, without however preventing the entry of the electrolyte.

The filling operation may also be assisted and accelerated by means of electrophoresis. If the pores are sufficiently large a uniform filling with even a dry and powdered active material can be induced by vigorous shaking alone.

An alternative possibility of filling the bubble cavities consists in chemically precipitating the active material from a solution of one of its salts inside the bubbles. This latter technique can be employed for instance in the case of lead. To this end the finely porous synthetic plastic foam is first soaked in the manner above described in a saturated solution of a lead salt, such as lead acetate or nitrate of lead, and then dried so that the lead salt is deposited inside the pores. However, the drying procedure is discontinued while the lead salt is still moist. The whole is then subjected to a reducing treatment by means of a reducing agent with an adequate reduction potential until the filling inside the pores consists of lead in fine subdivision. The surplus liquid or moisture can be removed by drying the filled carrier, for instance by infra-red radiation. When the pores are being filled the possibility of changes in volume which may occur during the charging and discharging cycles must likewise be borne in mind. For instance, if the filling consists of a lead salt subsequently reduced to lead in the manner described, it must be remembered that the electrolytic conversion of the lead to the dioxide is coupled with an increase in its volume, so care must be taken to see that the bubbles have not been entirely filled. This can be done by controlling the water content that is later removed. On the other hand, if the bubbles are filled with lead dioxide (to which it is expedient to make an addition of a wetting agent) the bubbles may be filled to capacity, for instance by shaking, or by refilling with a suspension after preliminary drying.

In the compression treatment, the synthetic mass first yields to compression at points of lowest resistance, that is to say, around the intercommunicating pores. The required temperature and pressures for each synthetic plastic can be readily determined by test. It is preferred to heat the material dielectrically or by infra-red irradiation which ensures a uniform distribution of temperature throughout the mass. Since the pressure is not evenly transmitted to the interior, deformation and reduction of the foam cells in the external layers is more pronounced than in the interior. This is a desirable feature as it increases the density of the electrodes near their surface and thereby affords a better safeguard against the washing out of the active material.

When positive lead accumulator plates are to be produced by filling a polyethylene cellular structure, for instance with lead dioxide, compression is continued until resistance appears to increase abruptly. This phenomenon indicates that optimum compression has now been reached. During the charging and discharging cycles the volume of the active material within the bubbles will then vary between a minimum value (discharged) and a maximum value in which the bubbles will be practically full.

Simultaneously with the hot pressing procedure the collecting conductor systems (grids) may be embedded in the mass. This can be done by pressing together two half plates with the grid interposed between them. On the other hand, pressed electrode blocks or parcels of foamed electrode sheets produced in accordance with the invention may be mechanically forced into a collecting grid. One important purpose of hot pressing is to create intimate contact between the particles of active material inside and between the bubbles.

Electrodes according to the invention are particularly well adapted for use in alkaline accumulators. Electrodes produced according to the invention are so porous that when immersed in the liquid electrolyte they immediately soak up the liquid and vigorously expel the air they contain. At the same time they are mechanically robust and when employed as lead accumulator electrodes they are capable of withstanding a large number of charging and discharging cycles without losing their active material. It will be readily understood that electrodes produced in accordance with the invention may be given any desired shape.

I claim:

1. A method of producing battery electrodes, comprising the steps of charging a suspension of finely divided lead dioxide in water, with the addition of a wetting agent, into the bubbles of a foamed thermoplastic carrier sheet, the lead dioxide particles being of a smaller size than the diameter of the pores connecting the bubbles in the carrier sheet, subsequently drying the foamed thermoplastic sheet carrying said suspension in its pores and bubbles and pressing the dried sheet to reduce the pore size and provide intimate contact between the particles of lead dioxide.

2. A method of producing battery electrodes, comprising the steps of charging a suspension of finely divided lead dioxide in water, with the addition of a wetting agent, into the bubbles of a foamed thermoplastic carrier sheet, the lead dioxide particles being of a smaller size than the diameter of the pores connecting the bubbles in the carrier sheet, subsequently drying the foamed thermoplastic sheet carrying said suspension in its pores and bubbles and compressing the dried sheet while heating the same to just below the softening point of the thermoplastic material to reduce the pore size and provide intimate contact between the particles of lead dioxide.

3. The method of claim 2, wherein the thermoplastic material is heated by infrared radiation.

4. The method of claim 2, wherein the thermoplastic material is heated by dielectric heating.

5. A method of producing battery electrodes, comprising the steps of charging a solution of a salt of a metal suitable as active material for the electrodes into the bubbles of a foamed thermoplastic carrier sheet, subsequently drying said foamed thermoplastic sheet carrying the solution in its pores and bubbles and reducing the salt to deposit the metal in said bubbles in finely divided form, and pressing the dried sheet to reduce the pore size and provide intimate contact between the particles of the finely divided metal.

6. A method of producing battery electrodes, comprising the steps of charging a concentrated solution of a lead salt into the bubbles of a foamed thermoplastic carrier sheet, subsequently drying the foamed thermoplastic sheet carrying the solution in its pores and bubbles until the lead salt is deposited in the bubbles but remains in a moist condition, precipitating finely divided metallic lead particles in the bubbles by treating the salt with a powerful reducing agent, and pressing the dried sheet to reduce the pore size and provide intimate contact between the lead particles.

7. A method of producing battery electrodes, comprising the steps of charging a solution of salt of a metal suitable as active material for the electrodes into the bubbles of a foamed thermoplastic carrier sheet, subsequently drying said foamed thermoplastic sheet carrying the solution in its pores and bubbles and reducing the salt to deposit the metal in said bubbles in finely divided form, and compressing the dried sheet while heating the same to just below the softening point of the thermoplastic material until resistance to further compression increases abruptly to reduce the pore size and provide intimate contact between the metal particles.

References Cited in the file of this patent

UNITED STATES PATENTS

| | | |
|---|---|---|
| 2,677,713 | Weil et al. | May 4, 1954 |
| 2,694,743 | Ruskin et al. | Nov. 16, 1954 |
| 2,737,541 | Coolidge | Mar. 6, 1956 |
| 2,738,375 | Schlotter | Mar. 13, 1956 |

FOREIGN PATENTS

| | | |
|---|---|---|
| 507,099 | Canada | Nov. 9, 1954 |